UNITED STATES PATENT OFFICE.

JOHN T. HARRIS, OF NEW YORK, N. Y.

PROCESS OF PREPARING POTABLE WATERS.

937,210. Specification of Letters Patent. Patented Oct. 19, 1909.

No Drawing. Application filed November 20, 1906. Serial No. 344,323.

*To all whom it may concern:*

Be it known that I, JOHN T. HARRIS, a citizen of the United States, residing at New York, in the county of New York and State of New York, have invented certain new and useful Improvements in Processes of Preparing Potable Waters, of which the following is a specification.

This invention is a method of preparing potable waters, and is intended more particularly for the treatment of waters for the removal therefrom of organic matter, mineral salts and suspended particles, and the production of a clear, bright and palatable water, sterilized and free from color and odor. According to my invention there are added to the water, or produced therein, compounds of the two trivalent metals, aluminum and iron; in connection with these I prefer to add to or produce in the water a compound of copper.

The compounds to the action of which the water is subjected may be soluble, as for instance the respective sulfates, which are slowly decomposed by the action of the soluble carbonates of potable waters yielding hydroxids or carbonates. I prefer however to add to the liquid or to produce directly therein a mixed coagulum containing the hydroxids of aluminum and iron, or of these metals and copper. In most cases I prefer to produce the compounds directly in the liquid to be treated by electrolysis, employing for this purpose the respective metals as anodes in the liquid.

As an example of the preferred embodiment of my method, I may proceed as follows: A flowing stream of water is subjected in a suitable conduit or tank to electrolysis between electrodes of opposite polarity, the anodes consisting of plates of aluminum and of iron, and the cathods consisting of iron or other suitable metal. The anodes are attacked yielding the corresponding hydroxids and producing a mixed coagulum containing the same. The amperage employed will of course depend upon the volume of liquid to be treated in a given time and upon the electrode area. The coagulum, together with such impurities originally contained in the liquid as are associated therewith, is separated by filtration, decantation or otherwise, and the water is ready for use.

It is found in practice that the results secured by subjecting the water to the simultaneous action of compounds of iron and aluminum are far superior to those obtained by treatment with compounds of either of these metals used alone, this superiority appearing not only in the increased clarifying effect but in the presence in the clarified water of smaller residual proportions of the compounds of the two metals, iron and aluminum. If compounds of either of these metals be used alone its precipitation in normal waters will be found to be incomplete, more particularly in the case of iron, in the use of which the water is often detrimentally affected by the iron salts retained in solution. When however compounds of both iron and aluminum are added, the precipitation of both metals is found in practice to be substantially complete.

In connection with the anodes of aluminum and iron above described I prefer to employ an electrode or electrodes of copper, producing thereby in connection with the mixed coagulum described a certain quantity of a soluble or insoluble compound of copper the composition of the same depending upon the character of the soluble salts contained in the water, thereby more effectively and rapidly sterilizing the liquid. The amount of copper required is very small, and does not affect the potable character of the water; usually a relatively small electrode surface of copper is employed. I have found moreover that copper is effective for this purpose whether employed as an anode or cathode.

I claim:

1. The method of preparing potable waters which consists in electrolyzing water in contact with anodes presenting separate surfaces of iron and aluminum and an electrode of copper.

2. The method of preparing potable waters which consists in electrolyzing water in the presence of hydroxids of iron and aluminum and a compound of copper.

3. The method of preparing potable waters which consists in electrolyzing water in the presence of an anode of a trivalent metal yielding a colloidal hydroxid and simultaneously subjecting the water to the action of a compound of copper.

In testimony whereof, I affix my signature in presence of two witnesses.

JOHN T. HARRIS.

Witnesses:
THOS. A. HUTCHINS,
S. V. NOBLE.